United States Patent
Wang et al.

(10) Patent No.: US 10,110,945 B2
(45) Date of Patent: Oct. 23, 2018

(54) MAINTAINING SYNCHRONIZATION OF ENCRYPTION PROCESS ACROSS DEVICES BY SENDING FRAME NUMBERS

(71) Applicant: Lattice Semiconductor Corporation, Portland, OR (US)

(72) Inventors: QinGang Wang, Shanghai (CN); HongPeng Wang, Shanghai (CN); Hoon Choi, Shanghai (CN)

(73) Assignee: Lattice Semiconductor Corporation, Portland, OR (US)

( * ) Notice: Subject to any disclaimer, the term of this patent is extended or adjusted under 35 U.S.C. 154(b) by 224 days.

(21) Appl. No.: 15/022,549

(22) PCT Filed: Mar. 13, 2015

(86) PCT No.: PCT/CN2015/074165
§ 371 (c)(1),
(2) Date: Mar. 16, 2016

(87) PCT Pub. No.: WO2016/145558
PCT Pub. Date: Sep. 22, 2016

(65) Prior Publication Data
US 2017/0064370 A1    Mar. 2, 2017

(51) Int. Cl.
*H04L 29/00* (2006.01)
*H04N 21/43* (2011.01)
(Continued)

(52) U.S. Cl.
CPC .......... *H04N 21/4302* (2013.01); *G09G 5/00* (2013.01); *H04N 21/4353* (2013.01); *H04N 21/4367* (2013.01); *H04N 21/43635* (2013.01)

(58) Field of Classification Search
CPC ... H04N 21/4302; H04N 21/4353; G09G 5/00
(Continued)

(56) References Cited

U.S. PATENT DOCUMENTS

| 8,562,609 B2* | 10/2013 | Schnieders | A61B 17/1659 606/79 |
|---|---|---|---|
| 8,644,504 B2* | 2/2014 | Choi | G09G 5/006 380/210 |
| 2010/0158243 A1 | 6/2010 | Tian et al. | |

FOREIGN PATENT DOCUMENTS

| CN | 101931784 A | 12/2010 |
|---|---|---|
| CN | 102348203 A | 2/2012 |
| WO | WO 2007/027285 A2 | 3/2007 |

OTHER PUBLICATIONS

PCT International Search Report and Written Opinion, PCT/CN2015/074165, dated Nov. 25, 2015, 12 Pages.

* cited by examiner

*Primary Examiner* — Brandon S Hoffman
*Assistant Examiner* — Michael D Anderson
(74) *Attorney, Agent, or Firm* — Fenwick & West LLP

(57) ABSTRACT

Maintaining synchronization of encryption processes at devices during transmission of encrypted data over a communication link is provided. Cipher link maintenance characters are sent from a source device to a sink device. A local cipher link maintenance character generated at the sink device for decrypting the encrypted data can be adjusted according to the cipher link maintenance character. After authentication, cipher link maintenance characters corresponding to units (e.g., frames) of the encrypted data are sent along with the units of the encrypted data. When a transmission error occurs during transmission of the encrypted data, cipher link maintenance characters can be used to correct the error in a local cipher link maintenance character generated at the sink device. Hence, even if the transmission error occurs in the communication link, the sink device can resolve the transmission error and maintain the synchroni- (Continued)

zation of encryption processes at the source and sink devices.

20 Claims, 4 Drawing Sheets

(51) Int. Cl.
G09G 5/00 (2006.01)
H04N 21/4363 (2011.01)
H04N 21/4367 (2011.01)
H04N 21/435 (2011.01)

(58) Field of Classification Search
USPC .......................................................... 380/201
See application file for complete search history.

MAINTAINING SYNCHRONIZATION OF ENCRYPTION PROCESS ACROSS DEVICES BY SENDING FRAME NUMBERS

BACKGROUND

1. Field of the Disclosure

This disclosure pertains to data communications, and more specifically to High-bandwidth Digital Content Protection ("HDCP") link verification when transmitting digital media.

2. Description of the Related Art

High-bandwidth Digital Content Protection ("HDCP") prevents copying of digital media content when it is transmitted across devices by connections that comply with various protocols such as DisplayPort ("DP"), Digital Visual Interface ("DVI"), and High-Definition Multimedia Interface ("HDMI"). Media content that is HDCP-encrypted can only be played on devices that are authorized by a licensing entity (e.g., Digital Content Protection LLC).

During the authentication process, a sending HDCP device exchanges authentication data with a receiving HDCP device. After the authentication process, the sending HDCP device encrypts data by XOR processing content data with a pseudo random data generated by a HDCP cipher. At the receiving HDCP device, the encrypted data is again XOR processed by the same pseudo random data generated, this time, by another HDCP cipher at the receiving HDCP device.

However, when encrypting and transmitting digital media using HDCP, digital media transmission may experience unexpected transmission noise. Such transmission noise can occur, for example, in the form of ground noise. As a result of unexpected transmission noise, synchronization of an HDCP link between an HDCP transmitter and an HDCP receiver may be disrupted, which may require re-establishing of the HDCP link. For example, when an HDCP receiver detects Error Correction Code ("ECC") errors exceeding a threshold, an HDCP transmitter may need to re-authenticate the HDCP receiver. Re-authenticating and re-establishing synchronization of an HDCP link consumes time and resources and may disturb users' experience.

SUMMARY

Embodiments of the present disclosure are related to receiving multimedia data at an apparatus. The apparatus includes a receiving module and a decryption module. The decryption module is coupled to the receiving module and includes a processor and a memory. The receiving module has at least one interface coupled to a communication link. The receiving module receives an encrypted video frame from a second apparatus via the at least one interface. The receiving module also receives a cipher link maintenance character corresponding to the encrypted video frame in a predetermined time and a bit location of a transition-minimized differential signaling (TMDS) channel of the communication link. The cipher link maintenance character represents information for verifying synchronization of an encryption of the multimedia data transmitted over the communication link. The decryption module decrypts the encrypted video frame in response to verifying based on the cipher link maintenance character that the encryption of the multimedia data is synchronized.

In one embodiment, the cipher link maintenance character includes a frame synchronization character representing a frame number of the encrypted video frame.

In one embodiment, the receiving module also compares the received frame synchronization character to a local frame synchronization character generated at the first apparatus to verify that the encryption of the multimedia data is synchronized with the second apparatus. The encryption of the multimedia is verified to be synchronized when the received frame synchronization character coincides with the local frame synchronization character.

In one embodiment, the receiving module also determines a difference between the received frame synchronization character and the local frame synchronization character, and adjusts the local synchronization character to coincide with the received frame synchronization character when the difference is less than a predetermined threshold. The encryption of the multimedia is verified to be synchronized in response to determining the difference is less than the predetermined threshold.

In one embodiment, the receiving module also determines a fame identification signal and a frame encryption status signal based on the received frame synchronization character.

In one embodiment, the decryption module decrypts the encrypted video frame based on the frame identification signal and the frame encryption status signal.

In one embodiment, the cipher link maintenance character also includes a media source indicator indicating whether the second apparatus is in a visual and audio mute state.

In one embodiment, the predetermined time is a data island period, the TMDS channel is TMDS channel 0, and the cipher link maintenance character is received in a predetermined bit of the TMDS channel. The predetermined bit of the TMDS channel is unencrypted.

Embodiments also relate to an apparatus for sending multimedia data communication to another apparatus. The apparatus includes an encryption module and a sending module coupled to the encryption module. The encryption module includes a memory and a processor. The encryption module generates an encrypted video frame. The encryption module also determines a cipher link maintenance character corresponding to the encrypted video frame. The cipher link maintenance character represents information for verifying synchronization of an encryption of the multimedia data transmitted over the communication link. The sending module has at least one interface coupled to a communication link. The sending module sends the encrypted video frame via the at least one interface, and sends the cipher link maintenance character in a predetermined time and a bit location of a transition-minimized differential signaling (TMDS) channel of the communication link.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments relate to maintaining synchronization of encryption processes at a source device and a sink device during transmission of encrypted data over a communication link. Cipher link maintenance characters are sent from a source device to a sink device and used to adjust a local cipher link maintenance character generated at the sink device for decrypting the encrypted data. After authentication, cipher link maintenance characters corresponding to units (e.g., frames) of the encrypted data are sent from the source device to the sink device along with the units of the encrypted data. When a transmission error occurs during transmission of the encrypted data, cipher link maintenance characters can be used to correct the error in a local cipher link maintenance character generated at the sink device. Hence, even if the transmission error occurs in the communication link, the sink device can resolve the transmission error and maintain the synchronization of encryption processes at the source and sink devices.

The synchronization described herein refers to an operational status of a cipher link defined by a certain protocol as being suitable for transmission of protected media content (i.e., data encrypted by a cipher) between two devices. The synchronization may be verified and maintained by cipher link maintenance characters sent from an authenticating device to an authenticated device.

The cipher link maintenance character described herein refers to information for verifying synchronization of an encryption of the multimedia data transmitted over a communication link. A cipher link maintenance character may include, for example, a frame synchronization character representing a frame number of an encrypted frame sent from the source device to the sink device. A local frame synchronization character refers to a frame number generated at a sink device to correspond to an encrypted frame received by the sink device. A cipher link maintenance character may also include a media source status indicator indicating whether the source device is in a visual and audio mute state.

Figure 1:
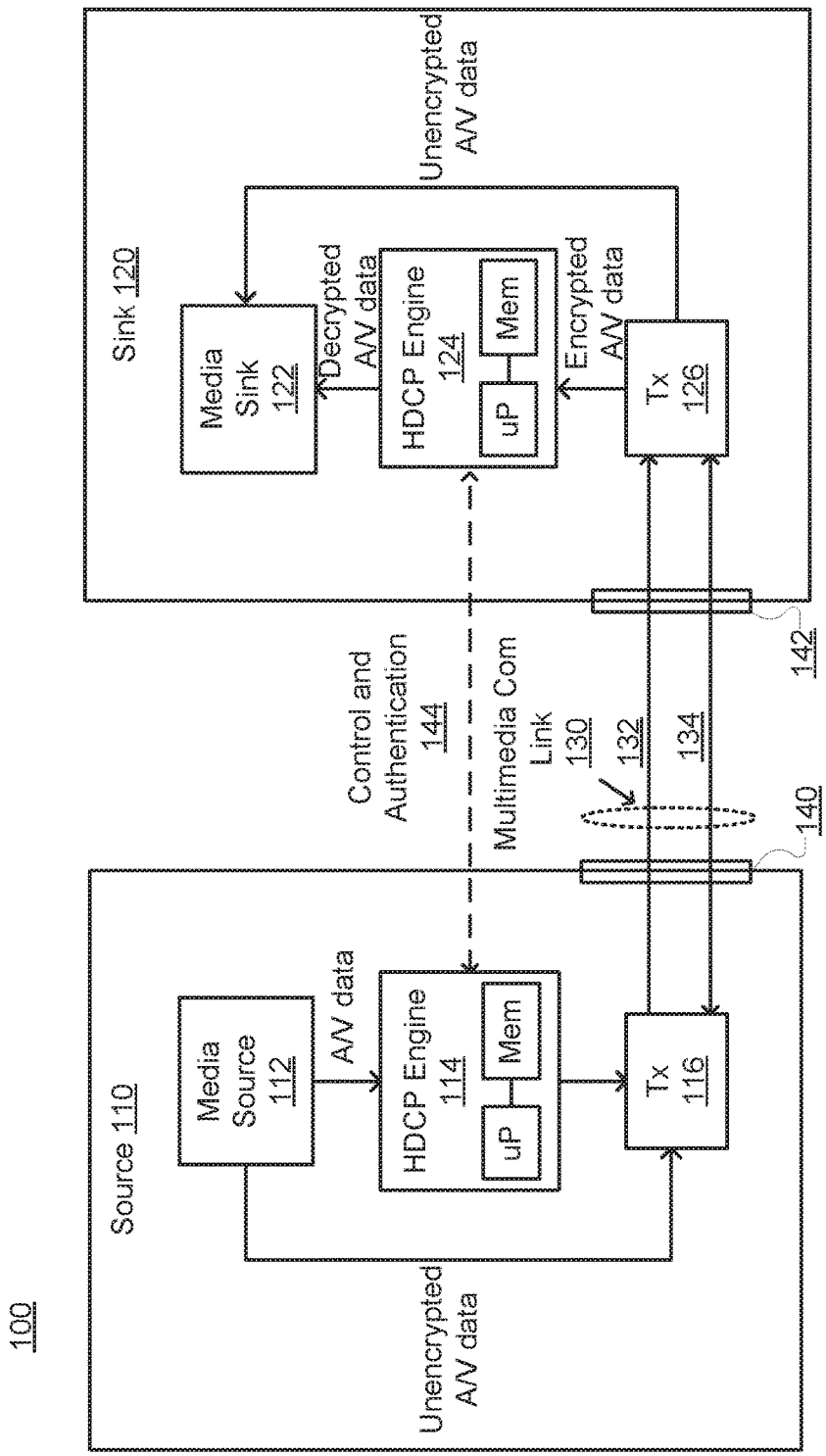
FIG. 1 is a high-level block diagram of a system for communicating data using High-bandwidth Digital Content Protection (HDCP), according to one embodiment.

FIG. 1 is a high-level block diagram of a multimedia system 100 for multimedia data communications, according to one embodiment. The multimedia system 100 includes a source device 110 and a sink device 120 communicating with the source device 110 through a multimedia communication link 130. The source device 110 is the source of audiovisual data streams. Examples of source device 110 can be mobile phones, digital video disc (DVD) players, blu-ray players, cable boxes, internet protocol television (IPTV) boxes, laptops, or integrated circuits (IC) within such devices. The sink device 120 receives audiovisual data streams, and may reproduce the received audiovisual data streams. Examples of the sink device 120 include liquid crystal display (LCD) televisions, LCD monitors, or integrated circuits (ICs) within such devices.

The source device 110 may include, among other components, a media source module 112, an HDCP engine 114, a transceiver 116 and an interface 140. The media source module 112 generates audiovisual data streams. Some of the audiovisual data streams may be encrypted by the HDCP engine 114 while others may be provided directly to the transceiver 116 for transmission without encryption. Audiovisual data streams, encrypted and/or unencrypted, are transmitted by the transceiver 116. The sink device 110 may include, among other components, a media sink module 122, an HDCP engine 124, a transceiver 126 and an interface 142.

Each of the HDCP engine 114 and the HDCP engine 124 includes a processor uP and a memory Mem coupled to the processor uP. Audiovisual data streams, encrypted and/or unencrypted, are received by the transceiver 126. Encrypted audiovisual data streams are decrypted by the HDCP engine 124. Unencrypted and/or decrypted audiovisual data streams are provided to the media sink module 122. Each of the transceiver 116 and the transceiver 126 includes a sending module to send data and a receiving module to receive data.

The multimedia communication link 130 includes an audiovisual channel 132 and a control channel 134. The source device 110 is coupled to the audiovisual channel 132 as well as the control channel 134 via the interface 140. The sink device 120 is coupled to the audiovisual channel 132 and the control channel 134 via the interface 142. The interfaces 140 and 142 are physical elements through which communications can occur, such as ports, connectors, pins, driving circuits, and receiving circuits.

The source device 110 transmits audiovisual data streams to the sink device 120 across the audiovisual channel 132. The audiovisual channel 132 is one-directional and carries video data streams from the source device 110 to the sink device 120. The audiovisual channel 132 may be implemented using a differential pair of wires. Alternatively, there may be multiple audiovisual channels 132 for transferring one or more video data streams. The audiovisual data stream can be displayed at the sink device 120 or passed on to another device for reproduction.

The source device 110 and the sink device 120 also exchange control data across the control channel 134. The control channel 134 is bi-directional and full duplex such that the source device 110 and sink device 120 can transfer control data with each other at the same time. Control data transmitted over the control channel 134 can include, among others, display data channel (DDC) commands, enhanced display identification data (EDID) data, and content protection codes. The control channel 134 may be implemented using a differential pair of wires or a single pair of wires. The control channel 134 may also carry a clock from the source device 110 to the sink device 120.

The HDCP engine 114 may include an encryption module that encrypts media content according to a cipher, and the HDCP engine 124 may include a decryption module that decrypts media content according to a cipher. The cipher may be established based on a public key encryption algorithm such as advanced encryption standard (AES) or Symmetric key encryption algorithm (e.g., data encryption standard (DES)). The HDCP engine 114 and the HDCP engine 124 exchange control and authentication information 144 (e.g., an HDCP link integrity verification value $R_i$) to ensure that they are authorized to perform encrypting and decrypting audiovisual data streams. The control and authentication information 144 is exchanged via the control channel 134 of the multimedia communication link 130. For example, when the multimedia communication link is a high definition multimedia interface (HDMI) link, the control channel 134 is the DDC channel, and when the multimedia communication link is a mobile high definition link (MHL), the control channel 134 is the CBUS channel. In some implementations, each HDCP engine includes a set of device private keys associated with a unique Key Selection Vector (KSV). A secret value (e.g., cipher) is generated based on KSVs of the HDCP engine 114 and the HDCP engine 124. In some implementations, the HDCP engine 114 has no private or publish key, and the HDCP engine 124 stores a private key and a public key. The HDCP engine 114 encrypts audiovisual data streams using the public key stored at the HDCP engine 124. Audiovisual data streams are encrypted and decrypted by using this shared secret value (e.g., cipher). In addition, the secret value is continually examined during transmission of audiovisual data streams to maintain cipher synchronization between the HDCP engines 114 and 124.

The HDCP engine 114 may initiate authentication at any time to verify that the HDCP engine 124 is licensed to receive protected media content (e.g., HDCP content). With the legitimacy of the HDCP engine determined, encrypted media content (e.g., HDCP content) is transmitted between the two devices based on shared secret values established during authentication. As such, eavesdropping devices are prevented from utilizing the encrypted media content. The HDCP engine 114 may examine the shared secret values to ensure on-going HDCP link integrity between the HDCP engine 114 and the HDCP engine 124. During the authentication process, the HDCP engine 114 may identify whether the HDCP engine 124 is compromised to permit unauthorized use of encrypted audiovisual stream. If the HDCP engine 124 is compromised, the HDCP engine 114 prevents the encrypted media content (e.g., HDCP content) from being transmitted to the HDCP engine 124.

The following examples are described below primarily using a high definition multimedia interface (HDMI) link as the multimedia communication link 130. However, embodiments of the present disclosure are not restricted to HDMI and other type of multimedia communication link such as a mobile high definition link (MHL) can also be used. The control channel 134 may further provide a high-speed, bi-directional path for data transfer between the source device 110 and the sink device 120.

Integrity and synchronization of the cipher link needs to be verified and maintained such that the HDCP engine 124, which is an authenticated HDCP engine, may continuously decrypt protected media content (e.g., an encrypted video frame). To continuously decrypt protected media content, the HDCP engine 114, which is an authenticating HDCP engine, notifies the authenticated HDCP engine of the identification and/or the encryption status of the encrypted media content. The identification of the encrypted media content indicates which encrypted media content should be decrypted, and the encryption status of the encrypted media content indicates whether the encrypted media content should be decrypted. For example, a vertical synchronization signal (Vsync) identifies the beginning of an encrypted video frame, and a set of control signals indicates an encryption status of an encrypted video frame. A video frame includes pixel data between vertical synchronization (Vsync) signals.

Different video frames may be encrypted by using different ciphers. The control and authentication information 144 may include the identification and/or the encryption status of the encrypted media content. For example, the control and authentication information 144 include an identification signal indicating the beginning of a video frame and a set of control signals indicating an encryption status of a video frame. After an HDCP engine (e.g., the HDCP engine 124) of a sink device is authenticated, an HDCP engine (e.g., the HDCP engine 114) of a source device may signal the authenticated HDCP engine (e.g., the HDCP engine 124) to begin decryption of encrypted audiovisual data streams by a set of control signals (e.g., CTL0-3).

In one embodiment, the link integrity check is performed during the vertical blanking interval preceding a corresponding frame. In some embodiments, each of the HDCP engines 114, 124 determines a new cipher initialization value and an HDCP link integrity verification value $R_i$, where i represents the frame number. The HDCP link integrity verification value may be determined based on a set of control signals indicating the encryption status of a frame. The HDCP engine 124 may provide the HDCP link integrity verification value to the HDCP engine 114 of a source device.

The HDCP engine 124 of a sink device compares a locally determined link integrity verification value (generated at the HDCP engine 124) to the link integrity verification value received from the source device 110 to determine whether the cipher synchronization is being maintained between the HDCP engines 114 and 124. When there is a mismatch between the local and received link integrity verification values, the HDCP engine 114 of the source device 110 determines that cipher synchronization with the HDCP engine 124 of the sink device 120 is lost. The integrity of the HDCP link may be verified at a rate at least once every two seconds. The HDCP link integrity verification value $R_i$ may be a 16-bit value and updated for every 128 frames.

The loss of cypher link synchronization can be determined by counting the number of ECC errors. The audiovisual data streams may include data island packets which incorporate ECC parity. The HDCP engine 114 of the source device 110 ensures that at least one data island packet is transmitted to the HDCP engine 124 of the sink device 120 per a predetermined number (e.g., two) of video frames. The HDCP engine 124 of the sink device determines the quantity of consecutive ECC errors in the data island packets and compares the number of consecutive ECC errors to a threshold. When the number of consecutive ECC errors is determined to be above a threshold (e.g., fifty), the sink device 120 determines the synchronization of the cipher link with the source device is lost. After the HDCP engine 124 of a sink device determines that the cipher synchronization is lost, the HDCP engine 124 of a sink device may notify the HDCP engine 114 of a source device that the cipher synchronization is lost.

Figure 2A:
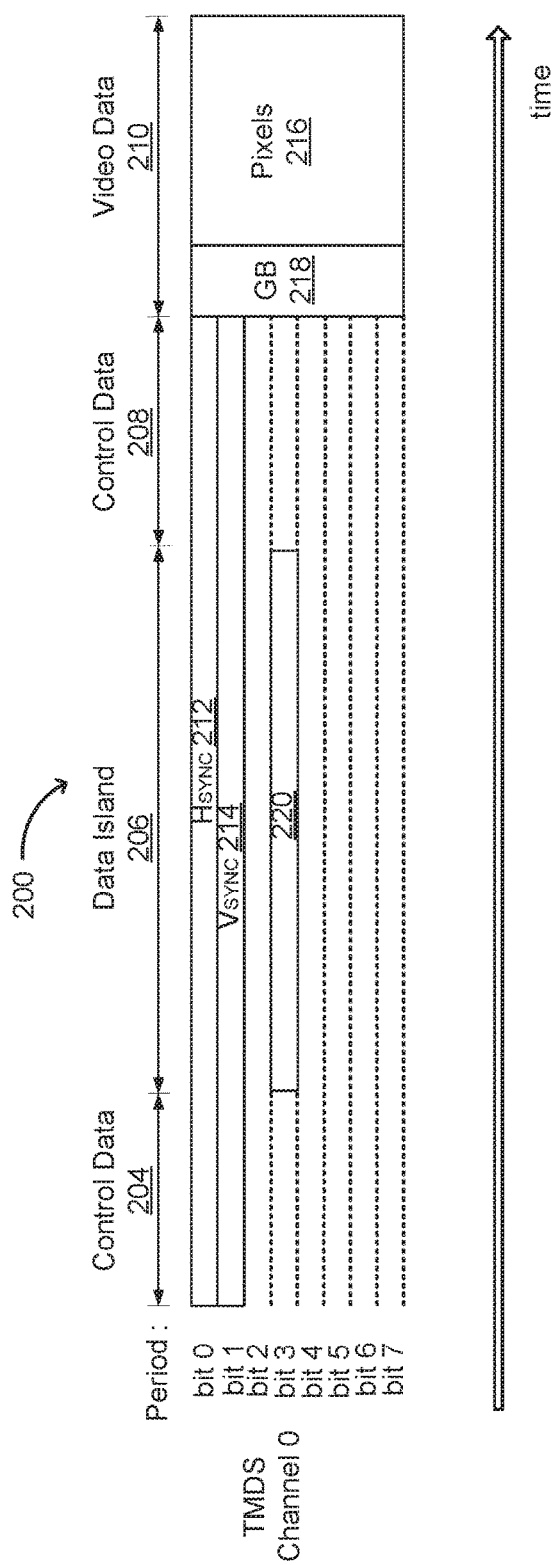
FIG. 2A is a diagram illustrating data sent in TMDS channel 0 of a multimedia communication link, according to one embodiment.

Cipher link maintenance characters may be sent from a source device to a sink device in an unencrypted data field to assist verifying of the cipher synchronization and to take remedial actions to maintain the cipher synchronization, if applicable. FIG. 2A is a diagram illustrating data sent in TMDS channel 0 of multimedia communication link 130, according to one embodiment. Taking the example of embodiments using transmitting data in accordance with HDMI or MHL protocol, video, audio, and auxiliary data may be interleaved by TMDS using different types of packets sent in different time periods such as control data period 204, data island period 206, and video data period 208. The data island period 206 may occur during the horizontal blanking interval (Hsync 212) and vertical blanking interval (Vsync 214). During the data island period 206, audio and auxiliary data is transmitted. During the video data period 208, the pixels 216 of an active video line are transmitted. The pixels 216 may follow a guard band 218 during the video data period 210. The control data period 204 is between a data island period 206 and a video data period 210.

Multiple TMDS channels may be used to transmit audio-visual data streams, encrypted or unencrypted, from a source device 110 to a sink device 120. As illustrated in FIG. 2A, the TMDS channel 0 includes multiple bits 0 through 7. During the data island period 206, the source device 110 sends a cipher link maintenance character 220 to the sink device 120 in a predetermined bit (e.g., bit 3) of a TMDS channel (e.g., the TMDS channel 0). The predetermined bit is not encrypted. The cipher link maintenance character 220 may be sent in any bit of the bits 3 through 7.

Figure 2B:
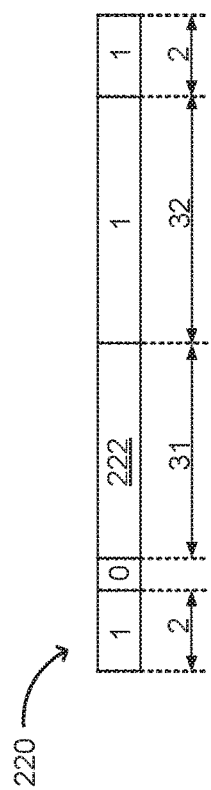
FIG. 2B is a diagram illustrating fields of data in a cipher link maintenance character, according to one embodiment.

FIG. 2B is a diagram illustrating fields of data in a cipher link maintenance character 220, according to one embodiment. The cipher link maintenance character 220 includes a frame synchronization character 222. The frame synchronization character 222 may be compared to the local frame synchronization character generated by the source device to verify the synchronization of the cipher link. Further, if the frame synchronization character 222 is inconsistent with the local frame synchronization character, the local frame synchronization character may be adjusted to coincide with the frame synchronization character 222. In this way, the cipher synchronization can be retained even if transmission errors result in inconsistent frame counts at the HDCP engine 114 and the HDCP engine 124.

In addition, a frame identification signal (e.g., Vsync) and/or a frame encryption indication signal (e.g., a set of control signals) may be generated based on the frame synchronization character 222. For example, Vsync can be determined based on the frame synchronization character 222 and a reference Vsync. The reference Vsync is determined from unencrypted audiovisual streams. The CTL3 signal is 528 pixels after the active edge of the Vsync. As such, an encrypted frame may be identified and decrypted correctly. The synchronization of the cipher link between the source device 110 and the sink device 120 is thereby maintained.

In one embodiment, the cipher link maintenance character 220 is TERC encoded for transmission over TMDS Channel 0. The cipher link maintenance character 220 is unencrypted, and a sink device obtains the cipher link maintenance character 220 by decoding a cipher link maintenance packet included in TMDS channel 0, bit 3.

In some embodiments, the frame synchronization character 222 is a frame number. The frame number may be, for example, a 31-bit value or a 38-bit value. The frame number may start with the value of one for the first video frame that is encrypted by the authenticating HDCP engine. The frame number may be incremented every time a frame is transmitted by the source device 110 or every time a frame is encrypted by the authenticating HDCP engine.

In some embodiments, the frame number does not increment when the HDCP engine is in a visual and audio mute state (AVMUTE state). When in the AVMUTE state, the sink device mutes the video display and audio output. During the AVMUTE state, the encryption is disabled for the next frame. Thus, the frame number does not resume incrementing until the HDCP engine encrypts a frame after the AVMUTE state. In one embodiment, the frame synchronization character 222 includes a frame number and a media source status indicator. The media source status indicator indicates whether a source device requires a sink device to stay in an AVMUTE state. When transmitting the AVMUTE state in the cipher link maintenance character 220, the frame number may be a 29-bit value and the media source status indicator may be a 2-bit value.

After receiving the cipher link maintenance character 220 from the source device 110, the sink device 120 extracts frame synchronization character 222 from the cipher link maintenance character. In some embodiments, the sink device 120 extracts the frame synchronization character 222 only when at least one ECC error is detected. The sink device 120 may compare the frame number locally generated to the frame number received from the source device 110. When the local frame number is inconsistent with the frame number received from the source device 110, the sink device 120 adjusts the local frame number to be consistent with the received frame number. As such, the cipher link maintenance character 220 assists maintaining of the cipher link synchronization.

Figure 3:
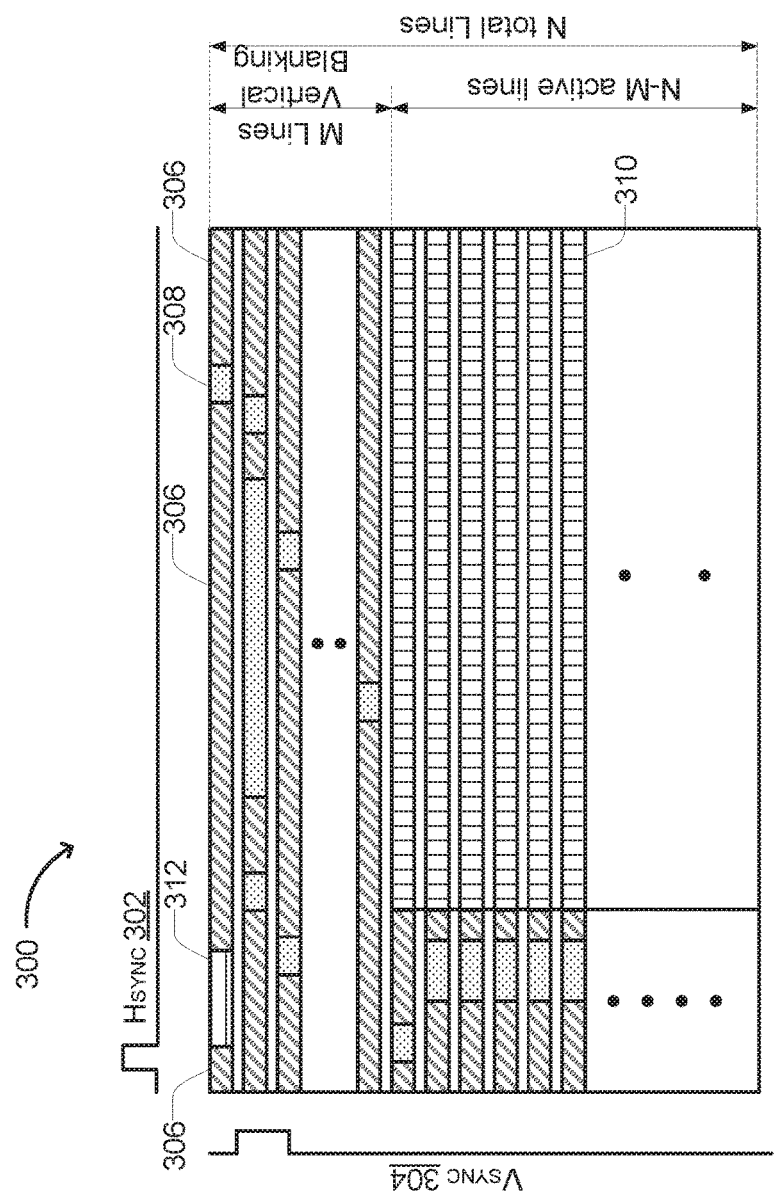
FIG. 3 is a diagram illustrating a video frame including a cipher link maintenance character, according to one embodiment.

FIG. 3 is a diagram illustrating a video frame including a cipher link maintenance character, according to one embodiment. The video frame 300 of FIG. 3 includes N (e.g., 525) lines, of which M (e.g., 45) lines are inactive during the vertical blanking period and (N-M) (e.g., 480) are active lines. Each line may include a control data period 306, data island period 308, and/or video data period 310.

A cipher link maintenance packet 312 may be transmitted during a data island period of the vertical blanking period. The source device 110 may transmit the cipher link maintenance packet 312 in a predetermined time (e.g., a number of pixel clocks) following the active edge (e.g., a rising edge or a falling edge) of Vsync 304. Transmission of other packets (e.g., AVI infoframe, audio infoframe) may be delayed until at least a predetermined time (e.g., a predetermined number of pixel clocks such as 112 pixel clocks) after the cipher link maintenance packet 312. A source device may transmit the cipher link maintenance packet 312 every predetermined number of frames. For example, the cipher link maintenance packet 312 may be transmitted per each frame or every two frames.

A cipher link maintenance packet 312 includes a frame synchronization character (e.g., frame number) sub-packet. Cipher link maintenance packet 312 may be embodied as a General Control Packet (GCP) or AVI InfoFrame packet, which is auxiliary data transmitted according to HDMI standard. GCP is a packet that carries control information other than information describing the source, the video, and audio being transmitted, vendor information, and clock regeneration information. An AVI InfoFrame packet is a packet that carries information describing the video being transmitted). Bit 3 of the TMDS channel 0 of the cipher link maintenance packet 312 is unencrypted during a data island period when transmitting GCP or AVI InfoFrame Packet of HDMI standard, and hence, suitable for transmitting the frame synchronization character (e.g., frame number) of a frame.

Figure 4:
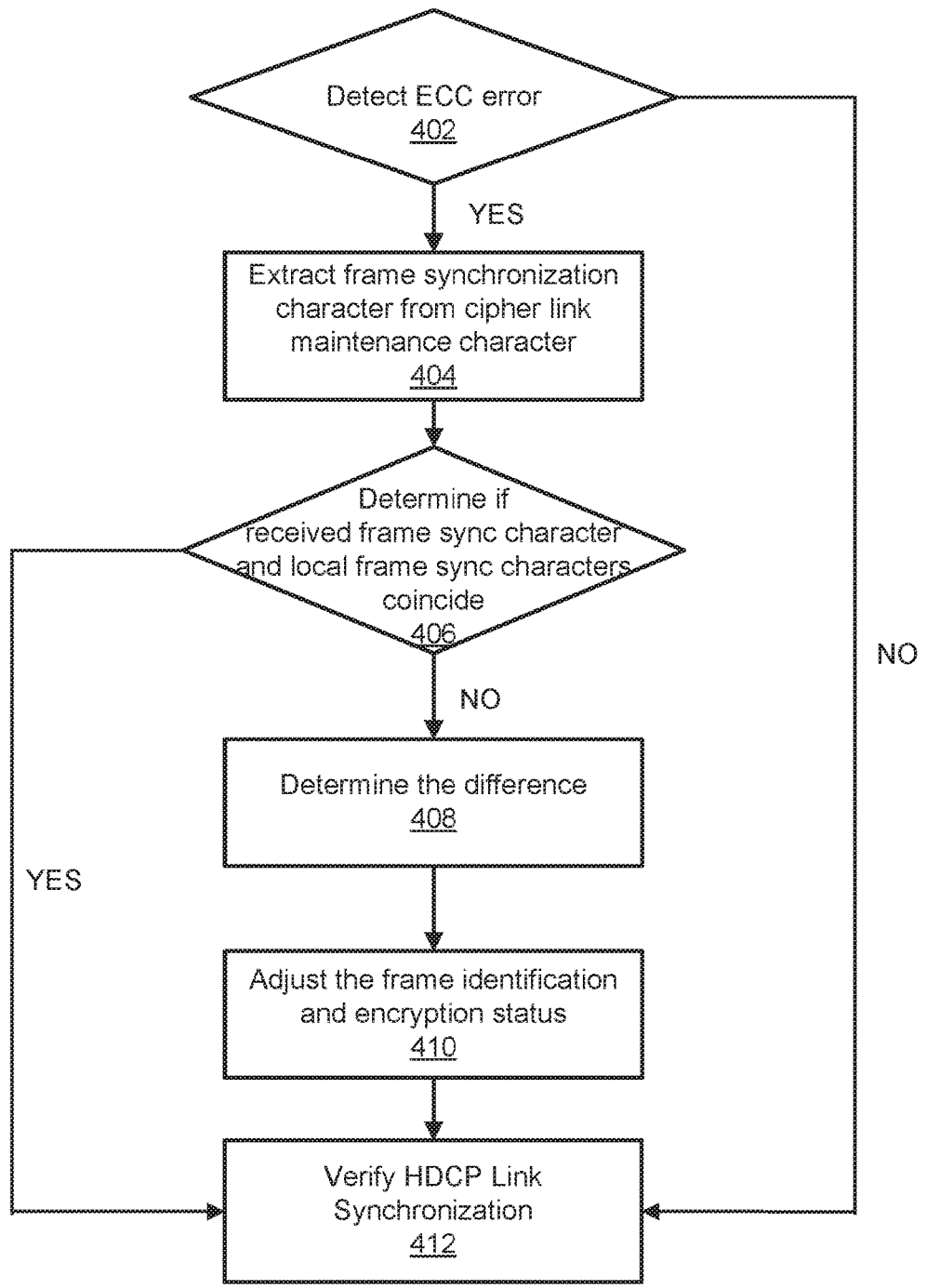
FIG. 4 is a flow diagram illustrating a process of verifying the synchronization of a cipher, according to one embodiment.

FIG. 4 is a flow diagram illustrating a process of verifying the synchronization of a cipher link, according to one embodiment. A sink device detects 402 any ECC error in a frame of data received over the multimedia communication link.

When no ECC error is detected, the HDCP synchronization of the cipher link with the sink device is verified 412. The sink device may decrypt a video frame received using a cipher corresponding to the video frame.

When the sink device detects an ECC error, the sink device extracts 404 the frame synchronization character from a cipher link maintenance packet. The sink device may determine the frame synchronization character from the cipher link maintenance packet. For example, in data transmitted according to HDMI standard, the sink device may decode bit 3 of TMDS channel 0 of GCP or AVI InfoFrame packet.

Then, it is determined 406 whether the frame synchronization character extracted from the cipher link maintenance packet and a local synchronization character generated by the sink device coincide. When the received frame synchronization character is determined to coincide with the local synchronization character, the synchronization of the cipher link with the source device is verified 412. The sink device may decrypt a video frame received using a cipher corresponding to the video frame as indicated by the local synchronization character.

When the received frame synchronization character does not coincide with the local frame synchronization character generated by the sink device, the cipher link between the sink device and the source device may be out of synchronization. When it is determined 406 that the received frame synchronization character does not coincide with the local synchronization character, the sink device determines 408 the difference between the received frame synchronization character and the local frame synchronization character.

When the difference between the received frame synchronization character and the local frame synchronization character is less than a threshold, the sink device may adjust 410 the frame identification and encryption parameters (e.g., frame number and other values indicating frame encryption) based on the received frame synchronization character.

In some embodiments, the cypher link maintenance character may include a media source status indicator. The media source status indicator indicates whether the source device requires the sink device to stay in an AVMUTE state. The sink device may adjust the local frame synchronization character to correspond to the frame synchronization character received from the source device increased by one when the sink device is not in an AVMUTE state, and adjust the local frame synchronization character to be the frame synchronization character received from the source device when the sink device is in an AVMUTE state.

In addition, the sink device may determine 410 a frame identification signal (e.g., Vsync) and a frame encryption status signal (e.g., a set of control signals) from the frame synchronization character. The sink device may decrypt the frame according to the frame identification signal and the frame encryption signal determined from the frame synchronization character received from the source device. Alternatively, the sink device may use the frame identification signal (e.g., Vsync) and the frame encryption signal (e.g., a set of control signals) corresponding to the frame preceding or following the frame to decrypt the frame.

After the sink device adjusts the local frame synchronization character according to the received frame synchronization character and decrypts a video frame, the synchronization of the cipher link with the source device is verified 412. As such, a cipher link (e.g., the HDCP link) between the sink device and the source device is maintained to be synchronized and the security is ensured.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure.

What is claimed is:

1. A first apparatus (authenticated engine) for receiving multimedia data communication, comprising:
   a receiving module having at least one interface coupled to a communication link, the receiving module configured to:
   receive an encrypted video frame from a second apparatus via the at least one interface, and
   receive a cipher link maintenance character corresponding to the encrypted video frame in a predetermined time and a bit location of a transition-minimized differential signaling (TMDS) channel of the communication link, the cipher link maintenance character representing information for verifying synchronization of an encryption of the multimedia data transmitted over the communication link with a second apparatus; and
   an decryption module coupled to the receiving module, the decryption module comprising a memory and a processor configured to decrypt the encrypted video frame in response to verifying based on the cipher link maintenance character that the encryption of the multimedia data is synchronized with the second apparatus.

2. The first apparatus of claim 1, wherein the cipher link maintenance character comprises a frame synchronization character representing a frame number of the encrypted video frame.

3. The first apparatus of claim 2, wherein the receiving module is further configured to compare the received frame synchronization character to a local frame synchronization character generated at the first apparatus to verify that the encryption of the multimedia data is synchronized with the second apparatus, and the encryption of the multimedia is verified to be synchronized in response to determining that the received frame synchronization character coincides with the local frame synchronization character.

4. The first apparatus of claim 3, wherein the receiving module is further configured to determine a difference between the received frame synchronization character and the local frame synchronization character and to adjust the local synchronization character to coincide with the received frame synchronization character in response to determining that the difference is less than a predetermined threshold, and the encryption of the multimedia is verified to be synchronized in response to determining that the difference is less than the predetermined threshold.

5. The first apparatus of claim 4, wherein the receiving module is further configured to determine a frame identification signal and a frame encryption status signal based on the received frame synchronization character.

6. The first apparatus of claim 5, wherein the decryption module is configured to decrypt the encrypted video frame based on the frame identification signal and the frame encryption status signal.

7. The first apparatus of claim 2, wherein the cipher link maintenance character further includes a media source indicator indicating whether the second apparatus is in an AVMUTE state.

8. The first apparatus of claim 1, wherein the predetermined time is a data island period, the TMDS channel is TMDS channel 0, and the cipher link maintenance character is received in a predetermined bit of the TMDS channel, the predetermined bit being unencrypted.

9. A first apparatus (authenticating engine) for sending multimedia data communication, comprising:
   an encryption module comprising a memory and a processor configured to:

generate an encrypted video frame, and determine a cipher link maintenance character corresponding to the encrypted video frame, the cipher link maintenance character representing information for verifying synchronization of encryption of the multimedia data transmitted over the communication link with a second apparatus; and a sending module having at least one interface coupled to a communication link, the sending module coupled to the encryption module and configured to:

send the encrypted video frame via the at least one interface to the second apparatus, and send the cipher link maintenance character in a predetermined time and a bit location of a transition-minimized differential signaling (TMDS) channel of the communication link.

10. The first apparatus of claim 9, wherein the cipher link maintenance character comprises a frame synchronization character representing a frame number of the encrypted video frame.

11. The first apparatus of claim 10, wherein the cipher link maintenance character further includes a media source indicator indicating whether the first apparatus is in an AVMUTE state.

12. The first apparatus of claim 9, wherein the predetermined time is a data island period, the TMDS channel is TMDS channel 0, and the cipher link maintenance character is sent in a predetermined bit of the TMDS channel, the predetermined bit being unencrypted.

13. A method for receiving multimedia data communication, comprising:

receiving, at a first apparatus, an encrypted video frame from a second apparatus;

receiving, at the first apparatus, a cipher link maintenance character corresponding to the encrypted video frame in a predetermined time and a bit location of a transition-minimized differential signaling (TMDS) channel of the communication link, the cipher link maintenance character representing information for verifying synchronization of an encryption of the multimedia data transmitted over the communication link with a second apparatus; and decrypting, at the first apparatus, the encrypted video frame in response to verifying based on the cipher link maintenance character that the encryption of the multimedia data is synchronized with the second apparatus.

14. The method of claim 13, wherein the cipher link maintenance character comprises a frame synchronization character representing a frame number of the encrypted video frame.

15. The method of claim 14, further comprising comparing the received frame synchronization character to a local frame synchronization character generated at the first apparatus to verify that the encryption of the multimedia data is synchronized with the second apparatus, wherein the encryption of the multimedia is verified to be synchronized in response to determining that the received frame synchronization character coincides with the local frame synchronization character.

16. The method of claim 15, further comprising determining a difference between the received frame synchronization character and the local frame synchronization character and to adjust the local synchronization character to coincide with the received frame synchronization character in response to determining that the difference is less than a predetermined threshold, wherein the encryption of the multimedia is verified to be synchronized in response to determining that the difference is less than the predetermined threshold.

17. The method of claim 16, further comprising determining a frame identification signal and a frame encryption status signal based on the received frame synchronization character.

18. The method of claim 17, further comprising decrypting the encrypted video frame based on the frame identification signal and the frame encryption status signal.

19. The method of claim 13, wherein the predetermined time is a data island period, the TMDS channel is TMDS channel 0, and the cipher link maintenance character is received in a predetermined bit of the TMDS channel, the predetermined bit being unencrypted.

20. A method for sending multimedia data communication, comprising:

generating, at a first apparatus, an encrypted video frame;

determining, at a first apparatus, a cipher link maintenance character corresponding to the encrypted video frame, the cipher link maintenance character representing information for verifying synchronization of an encryption of the multimedia data transmitted over the communication link with a second apparatus;

sending, by the first apparatus, the encrypted video frame via the at least one interface; and sending the cipher link maintenance character in a predetermined time and a bit location of a transition-minimized differential signaling (TMDS) channel of the communication link.

* * * * *